(12) United States Patent
Nakada

(10) Patent No.: US 9,828,920 B2
(45) Date of Patent: Nov. 28, 2017

(54) VEHICLE POWER PLANT CONTROL APPARATUS

(75) Inventor: Hayato Nakada, Yamanashi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/239,679

(22) PCT Filed: Aug. 22, 2011

(86) PCT No.: PCT/JP2011/068866
§ 371 (c)(1),
(2), (4) Date: Feb. 19, 2014

(87) PCT Pub. No.: WO2013/027254
PCT Pub. Date: Feb. 28, 2013

(65) Prior Publication Data
US 2014/0214303 A1    Jul. 31, 2014

(51) Int. Cl.
*F02D 29/02*      (2006.01)
*F02D 41/00*      (2006.01)
(Continued)

(52) U.S. Cl.
CPC ......... *F02D 29/02* (2013.01); *F02D 41/0007* (2013.01); *F02D 41/0072* (2013.01);
(Continued)

(58) Field of Classification Search
CPC ............. F02D 31/005; F02D 2011/102; F02D 41/1454; F02D 41/2454; F02D 41/1482;
(Continued)

(56) References Cited

U.S. PATENT DOCUMENTS

| 5,209,214 A | 5/1993 | Ikuta et al. |
| 5,313,395 A * | 5/1994 | Kawai ................ F02D 31/005 |
| | | 123/339.23 |

(Continued)

FOREIGN PATENT DOCUMENTS

| GB | 2 256 727 A | 12/1992 |
| JP | 2002-187464 | 7/2002 |

OTHER PUBLICATIONS

International Search Report dated Sep. 13, 2011, in PCT/JP11/068866 filed Aug. 22, 2011.

*Primary Examiner* — Hung Q Nguyen
*Assistant Examiner* — Brian P Monahon
(74) *Attorney, Agent, or Firm* — Oblon, McClelland, Maier & Neustadt, L.L.P.

(57) ABSTRACT

The purpose of the present invention is to prevent disturbance in the behavior of a power plant at the time of switching a controller in a vehicle power plant whose operation is controlled by manipulation of a plurality of actuators by the controller. In order to achieve the purpose, a vehicle power plant control apparatus provided by the present invention is configured as a target value tracking controller in which at least one controller calculates the amount of manipulation of the actuators according to an equation including an integrator for integrating a deviation between a state quantity and a target value thereof such that each of a plurality of state quantities of the power plant can track the corresponding target value. When the controller used for manipulating the actuators is switched from another controller to the target value tracking controller, the initial value of the integrator is inversely calculated such that, in a state equation of a plant model for the power plant with the state quantity as a state vector and the amount of manipulation as an input vector, a differential immediately before (Continued)

the switching of the state vector agrees with a differential immediately after the switching.

3 Claims, 2 Drawing Sheets

(51) Int. Cl.
*F02D 41/14* (2006.01)
*F02D 41/26* (2006.01)
(52) U.S. Cl.
CPC ......... *F02D 41/1401* (2013.01); *F02D 41/26* (2013.01); *F02D 2041/1409* (2013.01); *F02D 2041/1415* (2013.01); *F02D 2041/1418* (2013.01); *F02D 2041/1433* (2013.01); *Y02T 10/144* (2013.01); *Y02T 10/47* (2013.01)
(58) Field of Classification Search
CPC ............ F02D 41/1456; F02D 41/1479; F02D 11/105; F02D 2250/18; F02D 41/0072; F02D 41/28; F02M 25/0754; B60W 10/06
USPC ................... 123/339.23, 672, 687, 694, 696; 701/110, 101, 108
See application file for complete search history.

(56) References Cited

U.S. PATENT DOCUMENTS

| | | | | |
|---|---|---|---|---|
| 5,720,265 | A * | 2/1998 | Maki | F02D 13/0215 123/680 |
| 5,781,875 | A * | 7/1998 | Maki | F02D 41/008 123/480 |
| 2003/0023328 | A1* | 1/2003 | Yasui | F02D 41/0235 700/28 |
| 2003/0066518 | A1* | 4/2003 | Katoh | F02D 41/1403 123/672 |
| 2005/0178123 | A1* | 8/2005 | Uchiyama | F02D 41/0007 60/605.2 |
| 2007/0272207 | A1* | 11/2007 | Claudepierre | F02D 31/001 123/339.19 |
| 2011/0172897 | A1* | 7/2011 | Tsuzuki | F02D 35/023 701/103 |

* cited by examiner

VEHICLE POWER PLANT CONTROL APPARATUS

TECHNICAL FIELD

The present invention relates to a control apparatus for controlling an operation of a vehicle power plant by manipulating a plurality of actuators.

BACKGROUND ART

As a control method of a vehicle power plant, a control method using a state space model is known. Japanese Unexamined Patent Application Publication No. 2002-187464, for example, discloses a technology for calculating various manipulation quantities of an engine and a continuous variable transmission by a model tracking control method. In the model tracking control method disclosed in the gazette, an acceleration command value indicating preferable responsiveness of an acceleration estimated value corresponding to target acceleration is outputted from a standard model, and a deviation between the acceleration command value and the acceleration estimated value is integrated by an integrator. Then, an acceleration deviation integrated quantity and each state quantity of the standard model and vehicle model to be controlled are fed back and each manipulation quantity is calculated. Moreover, the gazette also describes a gain switching method in such acceleration feedback control. According to the switching method, an initial value of the integrator is calculated so that each manipulation quantity of the engine and the continuous variable transmission before and after the gain switching, that is, an input variable in a state formula of a plant model continuously changes.

However, the switching method disclosed in the gazette has a problem. In the switching method disclosed in the gazette, though continuity of the input variable is kept, continuity of a state variable relating to a behavior of the power plant is not guaranteed. Thus, it is likely that the behavior of the power plant is disturbed before and after the switching. Moreover, in the control of the vehicle power plant, there might be a case in which a plurality of controllers used in manipulation of an actuator are prepared, and the controller to be used is switched in accordance with an operation condition or an operation state, but the problem in the switching method disclosed in the above gazette may occur also when the controller operating the actuator is switched to another controller.

CITATION LIST

Patent Literature

Patent Literature 1: Japanese Patent Laid-Open No. 2002-187464

SUMMARY OF INVENTION

The present invention was made in view of the above-described problems and has an object to prevent occurrence of disturbance in the behavior of a vehicle power plant when a controller is switched in the vehicle power plant in which the operation thereof is controlled by manipulation of a plurality of actuators by the controller. In order to achieve the object, a vehicle power plant control apparatus according to the present invention is configured as follows.

According to an aspect of the present invention, this control apparatus is provided with at least two controllers. At least one controller of them is configured as a target value tracking controller which calculates a manipulation quantity of an actuator so that a plurality of state quantities of a power plant track the respective target values by using an equation including an integrator integrating a deviation between the state quantity and the target value. This control apparatus is provided with a selector for selecting a controller to be used for manipulation of the actuator and an arithmetic processing unit functioning in switching of the selected controller by the selector. The arithmetic processing unit inversely calculates an initial value of the integrator in a state equation of a plant model of this power plant using the state quantity as a state vector and the manipulation quantity as an input vector, when the selected controller by the selector is switched from another controller (second controller) to a first controller which is the target value tracking controller, so that a differential immediately before switching of the state vector accords with the differential immediately after the switching.

According to the control apparatus configured as above, a vector field on the state space governing a state trajectory does not change before and after the switching of the controller. Thus, since no discontinuity occurs in each state quantity of the power plant, the controller can be switched without disturbing the behavior of the power plant.

DESCRIPTION OF EMBODIMENT

An embodiment of the present invention will be described below by referring to the attached drawings.

Figure 1:
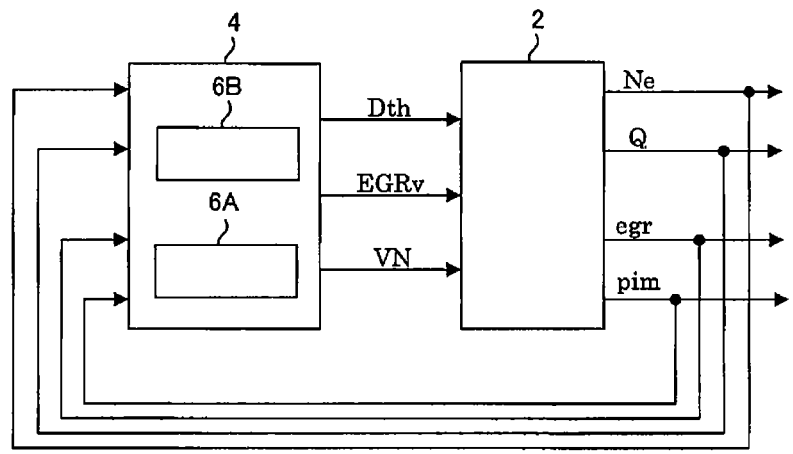
FIG. 1 is a diagram illustrating an outline of a control system of a vehicle power plant of an embodiment of the present invention.

FIG. 1 is a diagram illustrating an outline of a control system of a vehicle power plant of the embodiment. The control system includes a vehicle power plant 2 to be controlled and a control apparatus 4 for manipulating a plurality of actuators provided in the vehicle power plant 2 and controlling their operations. The vehicle power plant 2 of this embodiment is a diesel engine, and the actuator includes three types, that is, a diesel throttle, an EGR valve, and a variable nozzle of a turbo charger. The control apparatus 4 of this embodiment is realized as a part of a function of an engine ECU. From the diesel engine 2 to the control apparatus 4, various types of information including an EGR rate "egr," a supercharging pressure "pim," an engine rotation speed "Ne," and fuel injection "Q" are taken in. The control apparatus 4 calculates, based on the taken information, a throttle opening "Dth" which is a manipulation quantity of the diesel throttle, an EGR valve opening "EGRv" which is a manipulation quantity of the EGR valve, and a variable nozzle opening "VN" which is a manipulation quantity of the variable nozzle, respectively, and outputs the results to the diesel engine 2.

The control apparatus 4 is provided with at least two controllers 6A and 6B. The controller (first controller) 6A is configured as a target value tracking controller for cooperative control. The controller 6A calculates a manipulation quantity of each actuator so that each estimated value of the EGR rate and the supercharging pressure which are state quantities of the diesel engine 2 tracks the respective target values. The following formula (1) is an equation indicating the control rule of the controller 6A. In the formula (1), reference character "u" is an input variable vector. The input variable vector includes the throttle opening, the EGR valve opening, and the variable nozzle opening which are manipulation quantities. Reference character "x" is a state variable vector, and reference character "r" is its target value vector. The state variable vector includes the respective estimated values of the EGR rate and the supercharging pressure. Reference character "v" is an integral vector obtained by integrating a tracking error of the state variable vector with respect to a target value vector. Reference character "$U_{map}$" is an input offset quantity vector and includes a base value of each manipulation quantity. The input offset quantity vector is determined by search of a map using an engine rotation speed and a fuel injection amount as arguments. Reference characters "$K_x$," "$K_v$," and "$K_r$" are all coefficient matrices.

[Formula 1]

$$u = K_x x + K_v v + K_r r + u_{map}$$

$$v = \int (r-x) dt \qquad (1)$$

The controller (second controller) 6B is a controller for calculating a manipulation quantity of each actuator on the control rule different from that of the controller 6A. The controller 6B is configured as a target value tracking controller similarly to the controller 6A. These controllers 6A and 6B are realized in a software manner by an engine control algorithm programmed to the control apparatus 4.

Figure 2:
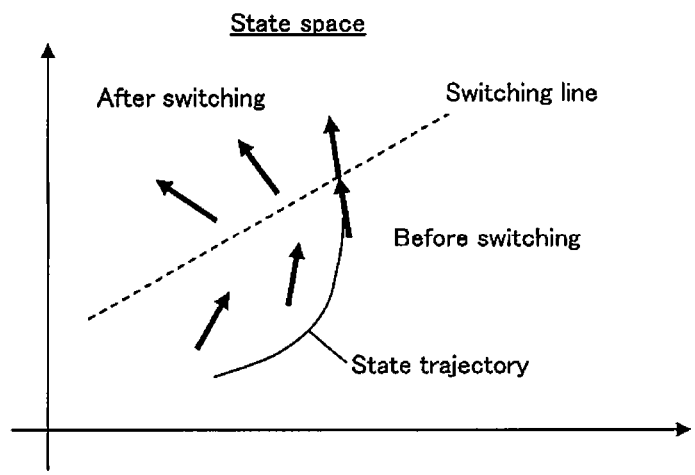
FIG. 2 is a diagram for explaining a switching idea of a controller applied to a control apparatus of the embodiment of the present invention.

The control apparatus 4 selects a controller to be used for manipulation of each actuator in accordance with the operation state of the engine. In more detail, when the operation state of the engine becomes a predetermined state, the control apparatus 4 switches the selected controller from the controller 6B to the controller 6A. The problem in the switching is occurrence of disturbance in the behavior of the diesel engine 2. In order to solve this problem, as schematically illustrated in FIG. 2, in a state space generated by the state quantity of the diesel engine 2, a vector field on the state space governing the state trajectory is required not to change before and after the switching of the controller. A switching method which does not change the vector field before and after the switching employed in the control apparatus 4 will be described below.

First, a state equation of the plant model of the diesel engine 2 is indicated in the following formula (2). In the formula (2), reference characters "A" and "B" are both coefficient matrices. Before the switching of the selected controller, reference character "u" in the formula (2) means the input variable vector of the controller 6B.

[Formula 2]

$$\dot{x} = Ax + Bu \qquad (2)$$

On the other hand, immediately after the switching of the selected controller, if the formula of the controller 6A indicated in the formula (1) is used, the state equation of the plant model of the diesel engine 2 is expressed by the following formula (3).

[Formula 3]

$$\dot{x} = Ax + B(K_x x + K_v v + K_r r + u_{map}) \qquad (3)$$

In order to prevent the vector field from changing before and after the switching, it is necessary that the differential immediately before the switching of the state variable vector and the differential immediately after the switching should accord with each other. For that purpose, the right side in the formula (2) and the right side in the formula (3) should accord with each other. By solving an integral vector "v" assuming that the right side of the formula (2) is equal to the right side of the formula (3), an equation of the formula (4) is obtained.

[Formula 4]

$$v = (BK)^{-1} B(u - K_x x - K_r r - u_{map}) \qquad (4)$$

The formula (4) is an equation for resetting the integrator of the controller 6A. By inputting a value calculated in the right side of the formula (4) into the integrator immediately after the switching as an initial value of the integral vector "v," the differential immediately before the switching of the state variable vector can be made to accord with the differential immediately after the switching.

The initial value of the integrator is an only freedom design parameter in the equation of the controller 6A. In this switching method, by appropriately resetting the value, the object that the vector field is not changed before and after the switching has been achieved. Moreover, even if a disturbance term corresponding to an environmental condition or a machine difference variation is added to the plant model indicated in the formula (2), the disturbance term is cancelled in the equation of the initial value of the integrator indicated in the formula (4). Therefore, according to this switching method, an advantage that an influence of the environmental condition or the machine difference variation is avoided can be obtained.

Figure 3:
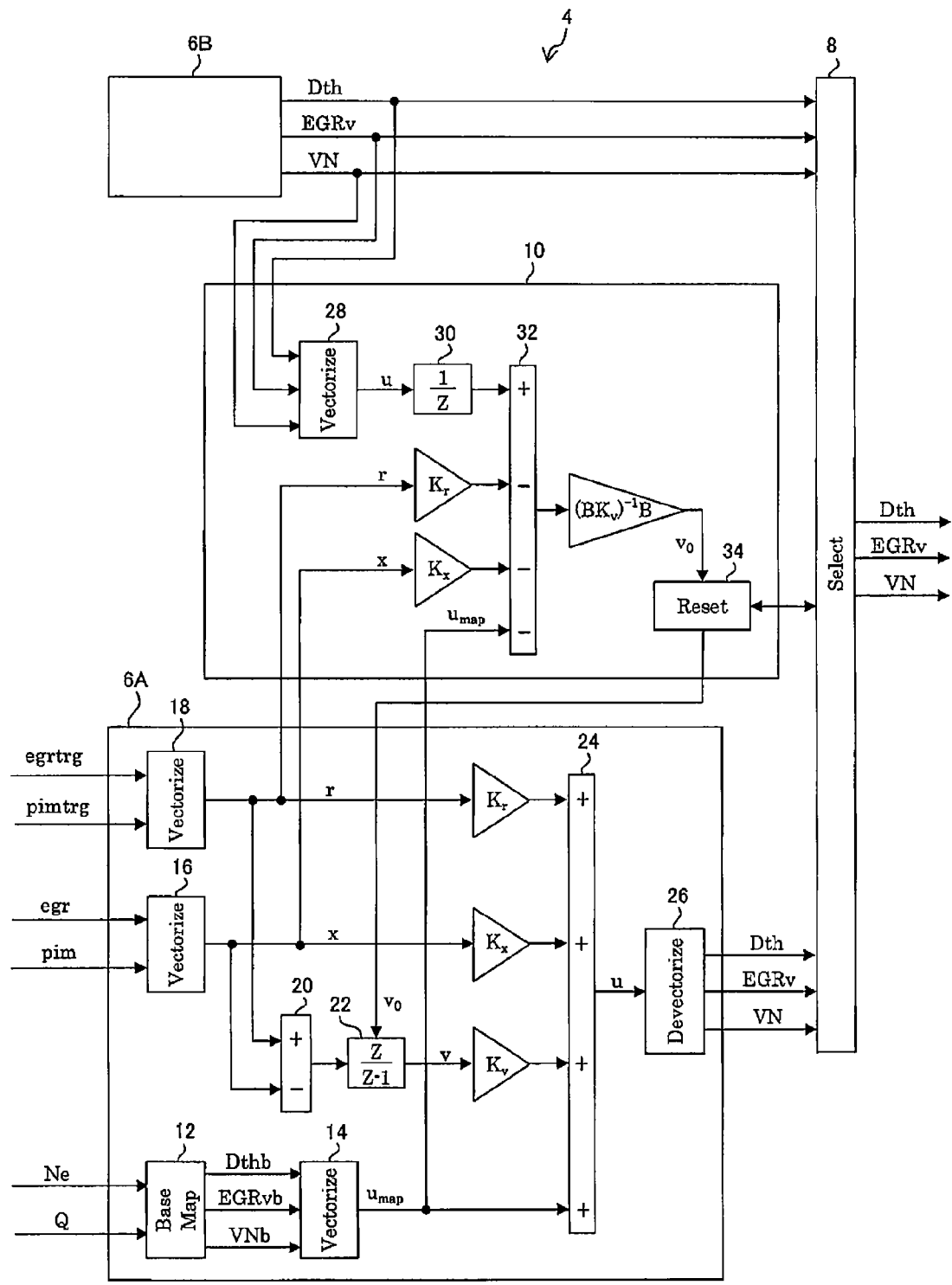
FIG. 3 is a diagram illustrating a detailed configuration of the control apparatus of the embodiment of the present invention.

Subsequently, a configuration of the control apparatus 4 for realizing the above-described switching method will be explained by using FIG. 3. As illustrated in FIG. 3, the control apparatus 4 is provided with a selector 8 and an arithmetic processing unit 10 in addition to the controller 6A and the controller 6B.

In the controller 6A, a target value "egrtrg" of the EGR rate and a target value "pimtrg" of the supercharging pressure are converted by a vectorizer 18 to a target value vector "r." Moreover, an estimated value "egr" of the EGR rate and an estimated value "pim" of the supercharging pressure are converted by a vectorizer 16 to the state variable vector "x." Moreover, a differential vector which is a deviation of the state variable vector "x" to the target value vector "r" is generated by a differentiator 20. The differential vector is inputted into the integrator 22, and the integrator 22 integrates the differential vector and generates an integral vector "v." Moreover, in a base map 12 provided in the controller 6A, a base value "Dthb" of the throttle opening, a base value "EGRvb" of the EGR valve opening, and a base value "VNb" of the variable nozzle opening are searched, respectively, by using the engine rotation speed "Ne" and the fuel injection amount "Q" as search keys. They are converted by a vectorizer 14 to the input offset quantity vector "$U_{map}$."

The controller 6A is provided with a calculator 24. Into the calculator 24, a vector "$K_r r$" obtained by converting the target value vector "r" by the coefficient matrix "$K_r$," a vector "$K_x x$" obtained by converting the state variable vector "x" by the coefficient matrix "$K_x$," a vector "$K_v v$" obtained by converting the integral vector "v" by the coefficient matrix "$K_v$," and the input offset quantity vector "$U_{map}$" are inputted. The calculator 24 calculates the input variable vector "u" from the vectors "$K_r r$," "$K_x x$," "$K_v v$," and "$U_{map}$" conforming to a predetermined calculation rule. The input variable vector "u" is converted by a devectorizer 26 to the throttle opening "Dth," the EGR valve opening "EGRv," and the variable nozzle opening "VN" which are numerical data. The controller 6A outputs the numerical data of these manipulation quantities to the selector 8.

Explanation concerning the configuration and contents of the processing of the controller 6B are omitted. In the controller 6B as well, each piece of the numerical data of the throttle opening Dth, "the EGR valve opening "EGRv," and the variable nozzle opening VN" is generated in accordance with a calculation procedure similar to that of the controller 6A, for example. The controller 6B outputs the numerical data of these manipulation quantities to the selector 8.

The selector 8 is means for selecting a controller to be used for the manipulation of the actuator in accordance with the operation state of the engine. Specifically, the selector 8 selects either one of the numerical data of each manipulation quantity inputted from the controller 6A and the numerical data of each manipulation quantity inputted from the controller 6B. The numerical data of each selected manipulation quantity is outputted from the control apparatus 4 to the diesel engine 2.

The arithmetic processing unit 10 is means for calculating the initial value of the integrator of the controller 6A and resetting the integral vector "v" when the selected controller by the selector 8 is switched from the controller 6B to the controller 6A. Into the arithmetic processing unit 10, the numerical data "Dth," "EGRv," and "VN" of each manipulation quantity generated by the controller 6B are taken. Moreover, the target value vector "r," the state variable vector "x," and the input offset quantity vector "$U_{map}$" generated by the controller 6A are taken in. The numerical data "Dth," "EGRv," and "VN" of each manipulation quantity are converted by a vectorizer 28 to the input variable vector "u." The obtained input variable vector "u" is delayed by a delayer 30 by 1 clock. As a result, when the current point of time is a point of time for switching from the controller 6B to the controller 6A, the input variable vector "u" of the controller 6B immediately before the switching is obtained.

The input variable vector "u" delayed by the delayer 30 is inputted into a calculator 32. Into the calculator 32, the vector "$K_r r$" obtained by converting the target value vector "r" by the coefficient matrix "$K_r$," the vector "$K_x x$" obtained by converting the state variable vector "x" by the coefficient matrix "$K_x$," and the input offset quantity vector "$U_{map}$" are also inputted. In the calculator 32, a difference vector between the input variable vector "u" and the sum of the vector "$K_r r$," "$K_x x$," and "$U_{map}$" is calculated. The arithmetic processing unit 10 converts the difference vector by a coefficient matrix "$(BK_v)^{-1}B$" so as to generate a vector "$v_0$." A resetting device 34 provided in the arithmetic processing unit 10 resets the integrator 22 of the controller 6A by using the vector "$v_0$" as an initial value at the timing when the controller selected by the selector 8 is switched from the controller 6B to the controller 6A.

According to the control apparatus 4 configured as above, before and after the switching from the controller 6B to the controller 6A, the integrator 22 of the controller 6A can be appropriately reset so that a change is not caused in the vector field of the state space defined by the EGR rate and the supercharging pressure.

The embodiment of the present invention has been explained. However, the present invention is not limited to the above-described embodiment but can be put into practice with various variations within a range not departing from the gist of the present invention. For example, in the above-described embodiment, two state quantities, that is, the EGR rate and the supercharging pressure are used, but the number of state quantities to be subjected to the cooperative control is not limited. For example, a turbine rotation speed, an exhaust manifold pressure and the like can be also used as the state quantities.

A control theory of the cooperative control by the controller 6A is not limited. The controller 6A can be designed on the basis of a control theory such as an optimal regulator, a pole placement method, sliding mode control, H∞ control and the like. The same applies to the controller 6B. However, regarding the controller 6B, each manipulation quantity may be individually determined from a map or the like instead of the cooperative control.

Moreover, the vehicle power plant to which the present invention is applied is not limited to the diesel engine. The present invention can also be applied to a spark ignition-type engine using gasoline or alcohol as a fuel and can also be applied to a gas turbine engine. Moreover, the present invention can also be applied to a hybrid system configured by combining an internal combustion engine and a motor. Furthermore, the vehicle power plant may include an automatic transmission combined with the internal combustion engine or a hybrid system.

REFERENCE SIGNS LIST

2 diesel engine
4 Control apparatus
6A, 6B Controller
8 Selector
10 Arithmetic processing unit

The invention claimed is:

1. A vehicle power plant control apparatus for controlling an operation of a vehicle power plant by operating a plurality of actuators, comprising:
   a first controller configured as a target value tracking controller which is programmed to calculate respective manipulation quantities of the actuators so that a state variable vector x including a plurality of state quantities of the vehicle power plant tracks a target value vector r including respective target values of the state quantities, using a vector equation representing a relation between an input variable vector u including the manipulation quantities, the state variable vector x, and an integral vector v obtained by integrating a tracking error of the state variable vector with respect to the target value vector r;
   a second controller different from the first controller and which is programmed to calculate respective manipulation quantities of the actuators;
   a selector which selects a controller to be used for the manipulation of the actuators between the first controller and the second controller; and
   an arithmetic processing unit which is programmed to calculate an initial value of the integral vector, when a switching from the second controller to the first controller is conducted by the selector, so that a derivative of the state vector $\dot{x}$ immediately after the switching is equal to the derivative of the state vector $\dot{x}$ immediately before the switching, the derivative of the state vector $\dot{x}$ being expressed by the state variable vector x and the input variable vector u in a state equation of a plant model of the vehicle power plant $\dot{x}=Ax+Bu$, in which A and B are coefficient matrices, wherein each of the first controller and the second controller includes
- a first vectorizer which converts the target values of the state quantities to the target value vector r,
- a second vectorizer which converts estimated values of the state quantities to the state variable vector x,
- a third vectorizer which converts base values of the manipulation quantities of the actuators into an input offset quantity vector $U_{map}$,
- a differentiator which generates a differential vector which is a derivative of the state variable vector x to the target value vector r,
- an integrator which integrates the differential vector and generates the integral vector v,
- a calculator which calculates the input variable vector u from a sum of: a vector $K_r r$ obtained by converting the target value vector r by a coefficient matrix $K_r$, a vector $K_x x$ obtained by converting the state variable vector x by a coefficient matrix $K_x$, a vector $K_v v$ obtained by converting the integral vector v by a coefficient matrix $K_v$, and the input offset quantity vector $U_{map}$, and
- a devectorizer which converts the input variable vector u to the manipulation quantities of the actuators which are numerical data, and wherein the arithmetic processing unit calculates an initial value of the integral vector $v_o$ by converting a difference vector between the input variable vector u of the second controller immediately before the switching and a sum of the vectors $K_r r$, $K_x X$, and $U_{map}$ of the first controller by a coefficient matrix $(BKy)^{-1}B$, and resets the integrator of the first controller by using the vector $v_o$ as the initial value of the integral vector at a timing when the selector conducts the switching from the second controller to the first controller.

2. The vehicle power plant control apparatus according to claim 1, wherein the actuators include a diesel throttle, an EGR valve, and a variable nozzle of a turbo charger, and the state quantities include an EGR rate and a supercharging pressure.

3. The vehicle power plant control apparatus according to claim 2, wherein the vehicle power plant is a diesel engine.

* * * * *